(12) United States Patent
Nishizawa et al.

(10) Patent No.: US 7,011,511 B2
(45) Date of Patent: Mar. 14, 2006

(54) INJECTION APPARATUS FOR AN INDUSTRIAL MACHINE

(75) Inventors: Makoto Nishizawa, Shizuoka (JP); Kazuhito Kobayashi, Shizuoka (JP); Junsuke Kawai, Shizuoka (JP)

(73) Assignee: Toshiba Kikai Kabushiki Kaisha, Tokyo (JP)

( * ) Notice: Subject to any disclaimer, the term of this patent is extended or adjusted under 35 U.S.C. 154(b) by 164 days.

(21) Appl. No.: 10/305,343

(22) Filed: Nov. 27, 2002

(65) Prior Publication Data

US 2003/0108640 A1    Jun. 12, 2003

(30) Foreign Application Priority Data

Dec. 10, 2001    (JP) .............................. 2001-375146

(51) Int. Cl.
*B29C 45/80* (2006.01)

(52) U.S. Cl. ........................ 425/145; 425/150; 425/574

(58) Field of Classification Search ................ 425/145, 425/150, 574
See application file for complete search history.

(56) References Cited

U.S. PATENT DOCUMENTS

| 4,820,464 A | * | 4/1989 | Sasaki et al. ................ 425/150 |
| 5,129,808 A | * | 7/1992 | Watanabe et al. ........... 425/145 |
| 5,417,558 A | * | 5/1995 | Heindel et al. .............. 425/150 |
| 6,059,556 A | * | 5/2000 | Koike et al. ................. 425/145 |
| 6,247,913 B1 | * | 6/2001 | Shibuya et al. .............. 425/145 |
| 6,457,964 B1 | * | 10/2002 | Yamaguchi et al. ......... 425/150 |

* cited by examiner

*Primary Examiner*—Tim Heitbrink
(74) *Attorney, Agent, or Firm*—Pillsbury Winthrop Shaw Pittman LLP

(57) ABSTRACT

An injection apparatus for industrial machine capable of high speed injection is provided with an injection barrel communicating with a cavity formed by at least a pair of mold dies and introducing mold material to an end portion on communicating side of the barrel, a screw for injection inserted in the barrel in which the screw is capable of reciprocating motion so as to inject and fill the mold material into the cavity, a support means holding an end of the screw opposite to the cavity and capable of moving in the direction of the reciprocating motion, a first drive mechanism including an electric servomotor for moving the support means in the direction of the reciprocating motion and a second drive mechanism for moving the first drive mechanism in the direction of the reciprocating motion.

14 Claims, 2 Drawing Sheets

INJECTION APPARATUS FOR AN INDUSTRIAL MACHINE

BACKGROUND OF THE INVENTION

1. Field of the Invention

The present invention relates to an injection apparatus for industrial machines such as plastic injection molding machine or die casting machine, specifically to the injection apparatus capable of molding an article with high quality by improving injection speed thereof.

2. Description of Related Art

The quality of a molded article is affected by the injection speed and pressure during injecting and filling in the industrial machine in which the mold material, such as melt resin or metal, is injected and filled into a the cavity formed within a mold die of the machine.

Incidentally, the cavity shape in the mold die is may be of various kinds, in accordance with the mold articles. As such, the function and capability of the injection speed, pressure, etc. required by the injection apparatus greatly vary.

On the other hand, because of the requirement for noiseless, cleanliness, good controllability, and spread of powerful servomotor for several years, demand for the industrial machine from a hydraulic drive system to an electric drive system has been rapidly changing.

An injection apparatus for injection molding machine of the type with the electric drive system is provided with a screw supported having one end capable of rotating to supply resin melt and kneaded in the barrel to the mold die(cavity). A support member of the screw is capable of linear movement by means of linear guides.

A drive force is supplied to the support member, which is generated by converting rotational movement of an electric motor as a drive source to linear movement using a pair of ball screw and ball nut arrangement.

There are two methods for the conversion. One method is a ball nut-drive method, and the other method is a ball screw-drive method. In the ball nut-drive method, the support member is connected to the ball screw engaging with the ball nut. The ball nut is may be rotated by the electric motor directly or may be indirectly coupled to it. In the ball screw-drive method, the support member is connected to the ball nut engaging with the ball screw. The ball screw is may be rotated by the electric motor directly or may be indirectly coupled to it.

Besides the ball screw and ball nut arrangement, there exists an injection apparatus with the support member connected to a mechanism in which a linear movement is produced through a drive force generated by electromagnetic force like a linear motor, or with a plunger instead of the screw.

Even in such injection apparatus for injection molding machine of the type with the electric drive system, there still exists limits as to the requirement for a high speed injection capable of molding the mold material mentioned above while still producing a high quality molded article.

SUMMARY OF THE INVENTION

Accordingly, an object of the present invention is to provide an injection apparatus for industrial machine capable of high speed injection.

To achieve this and other objects, the injection apparatus for industrial machine of the present invention is provided with an injection barrel communicating with a cavity formed by at least a pair of mold dies and introducing mold material to an end portion on a communicating side of the barrel, a screw for injection inserted in the barrel in which the screw is capable of reciprocating motion so as to inject and fill the mold material into the cavity, a support means holding an end of the screw opposite to the cavity and capable of moving in the direction of the reciprocating motion, and a first drive mechanism for moving the support means in the direction of the reciprocating motion. The injection apparatus is further provided with a second drive mechanism for moving the support means or the first drive mechanism in the direction of the reciprocating motion.

In other embodiments, a plunger may be used instead of the screw. Also, in some other embodiment, at least either one of the first drive mechanism or the second drive mechanism may be constructed to have an electric servomotor, and a ball screw and ball nut arrangement that converts rotating motion of the rotary drive axis of the electric servomotor to linear motion. Then in case of constructing the first drive mechanism by means of the electric servomotor, and the ball screw and ball nut arrangement, the second drive mechanism may be constructed to be parallel with the ball screw of the first drive mechanism, and also may be constructed in series or concentrically to the axis line of the ball screw.

Further, at least one of the first and second drive mechanisms may be constructed by means of either one or combination of roller screw, linear motor and hydraulic or pneumatic actuator.

The injection speed can be greatly increased by moving the first drive mechanism through the second drive mechanism. In this case if a plurality of the first drive mechanism and the second drive mechanism are arranged to be parallel, injection drive force can be greatly increased, too.

BRIEF DESCRIPTION OF THE DRAWINGS

The above and other objects, features, and advantages of the present invention will be made more apparent from the description of preferred embodiments with reference to the accompanying drawings wherein.

DETAILED DESCRIPTION OF THE INVENTION

The embodiments will be explained below with reference to the accompanying drawings.

Figure 1:
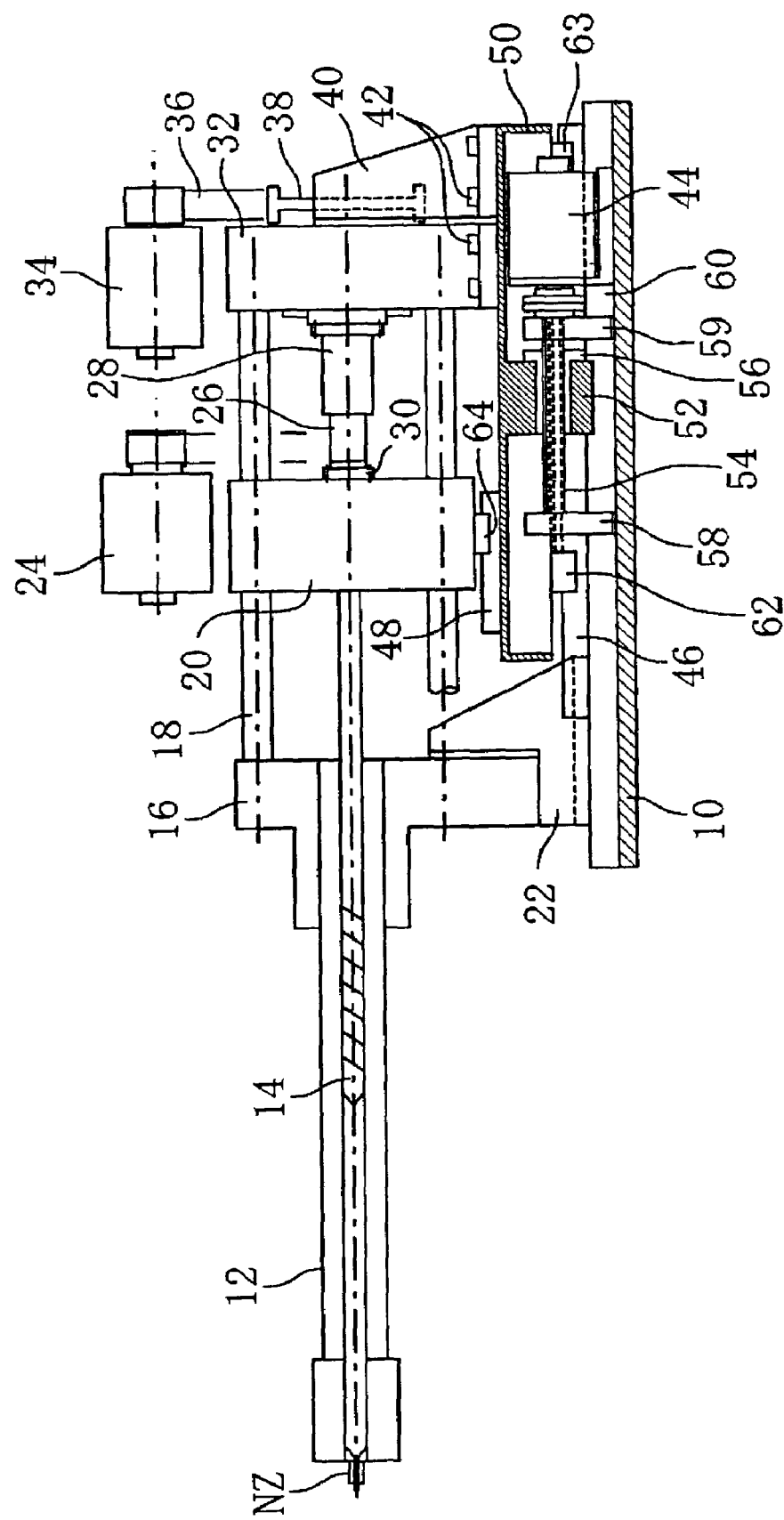
FIG. 1 is a front view of the injection apparatus for injection molding machine of the type with the electric drive system illustrative of an embodiment of the present invention.

FIG. 1 shows a front view of the injection apparatus for injection molding machine of the type with the electric drive system of the present invention.

As shown in FIG. 1, there is provided an injection apparatus arranged over a structural member 10 which is stationed on a base (not shown) of the injection molding machine of the type with the electric drive system.

Reference numeral 12 designates a barrel that forms an injection tube, and supported by a barrel support member 16. At the most left end of the barrel 12, a nozzle NZ is mounted. In the barrel 12, a screw 14, operating as a pushing member, is inserted so as to be capable of reciprocating motion in the direction of the screw axis. The right most end of the screw 14 is held on a screw support member 20 that is slidably supported by a guide rod 18, so that the screw 14 is capable of rotating and restricted from moving in the direction of the screw axis.

Further, the lower portion of the barrel support member 16 is fixedly mounted through a member 22 on the structural member 10. Incidentally, the screw support member 20 defines a support member of the present invention.

Reference numeral 18 designates a guide rod, the left end of which is fixedly connected to the barrel support member 16. The right end of the guide rod 18 is slidably mounted on a support member 32, which is a part of a drive mechanism generating drive force for moving the screw 14 in the axis direction through the screw support member 20. The guide rod 18 is mounted at each corner portion of the barrel support member 16.

Reference numeral 24 designates an electric servomotor mounted on the screw support member 20. The electric servomotor 24 executes a charging process for melt resin by rotating the screw 14 through a rotation transmission mechanism (not shown). In the support member 32, a ball nut 28 is mounted so that the ball nut 28 is capable of rotating and restricted from moving in the direction of the axis.

Reference numeral 26 designates a ball screw fixedly connected at the right side portion of the screw support member 20 through fittings 30, the screw portion of which engages with the ball nut 28. Accordingly, rotation of the ball nut 28 causes the screw 14 to advance and retract in the barrel 12 as the screw 14 is restricted from moving in the axis direction to the screw support member 20.

Reference numeral 34 designates an electric servomotor that operate as a drive source to drive the screw 14. A timing belt 36 is mounted between a pulley mounted on the rotary drive axis of the servomotor 34 and a pulley 38 stationed in the right side of the support member 32.

The pulley 38 is one with the ball nut 28 and rotatably mounted on the support member 32. Incidentally, the ball screw 26, the ball nut 28, the support member 32, the electric servomotor 34, the timing belt 36 and pulley 38 define a first drive mechanism of the present invention. It will be appreciated that, although only one first drive mechanism is illustrated in FIG. 1, a plurality of the first drive mechanisms can be stationed in parallel. Reference numeral 40 designates a reinforcement member for the support member 32.

The relationship between the ball screw 26 and the ball nut 28 in view of drive force transmission may be reversed. In the case the ball nut 28 is fastened to the screw support member 20, and the ball screw 26 is mounted on the support member 32 rotatably but with restricted from moving in the direction of the screw axis.

The above description corresponds to the conventional mechanism on the injection apparatus for injection molding machine of the type with the electric drive system except that each right end of the guide rod 18 is fastened to the support member 32.

In the conventional machine with such a mechanism, resin is melted and kneaded in the barrel 12, and introduced at one end portion of the barrel 12. Then it is injected into a cavity at injection speed V1 of the screw 14.

Hereinafter, a mechanism to be added to the conventional mechanism will be explained.

On the structural member 10, there is provided with a linear guide 46 parallel to the guide rod 18, on which a support plate 50 mounting guide members 62 and 63 at its lower end is movably stationed. The support member 32 and the reinforcement member 40 are fastened by bolts 42 to the surface near the right end portion of the support plate 50. Also, on the surface near the left end of the support plate 50, a linear guide 48 parallel to the guide rod 18 is stationed, and the screw support member 20 is movably guided by a guide member 64 mounted at the lower end of the screw support member 20.

Further, under the support plate 50, there is provided with an electric servomotor 44 fastened on the structural member 10. The rotary drive axis of the electric servomotor 44 is connected through a coupling 60 to a ball screw 54 rotatably supported by bearings 58 and 59.

The ball screw 54 engages with a ball nut 56 which is mounted on a support member 52 formed at the under portion near the center of the support plate 50.

The support member 52 restricts the ball nut 56 from rotating and moving in the direction of the axis.

In such an arrangement, as the electric servomotor 44 rotates, the ball screw 54 rotates and, as a result, the support plate 50 moves rectilinearly. Incidentally, the support plate 50, the electric servomotor 44, the ball screw 54, the ball nut 56, the support member 52, bearings 58 and 59, and the coupling 60 define a second drive mechanism of the present invention. Because the support member 32 is fastened to the support plate 50, the screw 14 moves in the left direction rectilinearly through the support member 32, the ball nut 28, the ball screw 26 and the screw support member 20 as the support plate 50 moves in the left direction rectilinearly, even when the electric servomotor 34 stops rotating. Then, further in case that the electric servomotor 34 is driven and the screw support member 20 moves in the same direction, the moving velocity of the screw 14 in the left direction is given as the resultant, that is, V1+V2 of each velocity V1, V2 based on rotary drive force that both of electric servomotors 34, 44 generate. In the case the stroke length of the screw 14 increases by the range of linear movement of the support plate 50.

In FIG. 1, only one drive mechanism is provided under the support plate 50, which is comprised of the electric servomotor 44, the ball screw 54, the ball nut 56, etc. However, a plurality of such drive mechanisms may be provided on the structural member 10 wherein each the electric servomotor is controlled in synchronization with each other.

It is possible to decentralize or share a required drive force by arranging such plurality of drive mechanisms so that members such as the electric servomotor the ball screw and the ball nut in the drive mechanism can be downsized and also used for long time.

In the above description of FIG. 1, the drive mechanism for reciprocating motion of the screw 14 and the support plate 50 is provided with an electric servomotor and a conversion unit by means of a ball screw and ball nut arrangement. However, a roller screw, a linear motor, or hydraulic and/or pneumatic actuators can be substituted for them.

Figure 2:
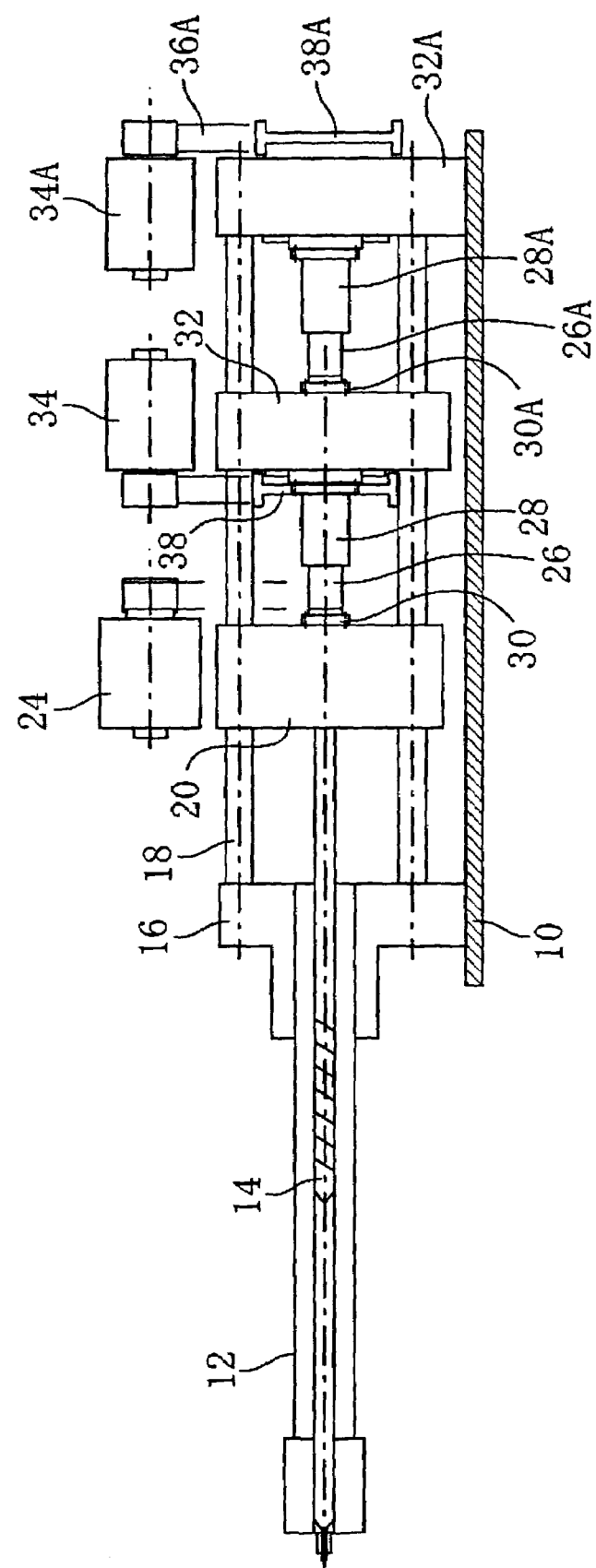
FIG. 2 is a front view of the injection apparatus of another embodiment of the present invention illustrative of an arrangement of another linear drive mechanism at the most right end portion of guide rods extending through a support member to the right, instead of a support plate in FIG. 1.

FIG. 2 is illustrative of a second embodiment of the present invention, and also illustrative of an arrangement of another linear drive mechanism at the right most end portion of guide rod 18 extending through the support member 32 to the right, instead of the support plate 50 shown in FIG. 1. For the sake of brevity, detailed descriptions of each element corresponding to the reference numerals identical to those in FIG. 1, are omitted. Similarly, in FIG. 2 reference numerals 26A, 28A, 30A, 32A, 34A, 36A, and 38A are the elements for functions similar to reference numerals 26, 28, 30, 32, 34, 36, and 38 in FIG. 1, respectively. The difference points are such that the lower part of the support member 32A in FIG. 2 is fastened on the structural member 10 and the right most end portions of the guide rods 18 are fastened to the support member 32A. Accordingly, in FIG. 2 rotary drive force transmitted from the electric servomotor 34A to the ball nut 28A causes the ball screw 26A to move rectilinearly and, as a result, the support member 32 slidably moves on the guide rods 18 rectilinearly.

In FIG. 2 the ball screw 26A is arranged in series and concentrically to the ball screw 26. As described in FIG. 1, the elements of numerals 26 to 38 and numerals 26A to 38A may be constructed by means of other roller screw, a linear motor, or hydraulic and/or pneumatic actuators. Furthermore, as to the arrangement for the above elements of numerals 26A to 38A, it is possible to construct so that still another drive mechanism is stationed on the right side of the support member 32A, a plurality of drive mechanisms are stationed on the left side surface of the support member 32A, or those mechanisms are combined. In the case, however, it should be noticed that arranging a plurality of drive mechanisms in series leads to a space problem because the injection apparatus becomes long.

According to the present invention, there is an advantage that high speed injection can be achieved, since the injection apparatus for industrial machine of the present invention is provided with an injection barrel communicating with one end of a cavity formed by at least a pair of mold dies and introducing mold material to an end portion on communicating side of the barrel, a screw for injection inserted in the barrel in which the screw is capable of reciprocating motion so as to inject and fill the mold material into the cavity, a support means holding an end of the screw opposite to the cavity and capable of moving in the direction of the reciprocating motion, a first drive mechanism for moving the support means in the direction of the reciprocating motion, a second drive mechanism for moving the support means or the first drive mechanism in the direction of the reciprocating motion.

According to the present invention, there is another advantage that mold articles with high quality can be produced without employing expensive and powerful electric servomotors since a plurality of the first drive mechanisms and the second drive mechanisms are able to be arranged in parallel to increase the drive force on the industrial machine.

According to the present invention, there is still another advantage that mold articles of relatively large size can be produced since injection stroke of the machine lengthens by the stroke of the second drive mechanism.

It should be understood, of course, that the foregoing disclosure relates only to preferred embodiments of the invention, and that it is intended to cover all changes and modifications of the example of the invention herein chosen for the purpose of the disclosure which does not constitute departures from the spirit and scope of the invention set forth in the appended claims.

What is claimed is:

1. An injection apparatus for an industrial machine, comprising:
   an injection barrel that communicates with a cavity formed by at least a pair of mold dies, said injection barrel configured to introduce mold material to said cavity;
   a screw inserted in said barrel in which said screw is capable of being rotated and of a reciprocating motion so as to inject and fill said mold material into said cavity;
   a support member configured to hold an end of said screw opposite to said cavity, said support member being capable of moving in a direction of said reciprocating motion;
   a first drive mechanism, including a first motor, configured to move said support member in the direction of the reciprocating motion;
   a second drive mechanism, including a second motor, configured to move said first drive mechanism in the direction of the reciprocating motion; and
   a third drive mechanism, including a third motor, configured to rotate said screw in said barrel.

2. The injection apparatus for an industrial machine as in claim 1, wherein the first drive mechanism is provided with an, a ball screw and a ball nut arrangement that converts rotating motion of a rotary drive axis of the motor into linear motion.

3. The injection apparatus for an industrial machine as in claim 2, wherein the second drive mechanism is arranged to be in parallel with the ball screw of the first drive mechanism.

4. The injection apparatus for an industrial machine as in claim 2, wherein the second drive mechanism is arranged to be in series or concentric to the axis line of the ball screw.

5. The injection apparatus for an industrial machine as in claim 1, 2, 3 or 4, wherein the first drive mechanism further includes at least one of a roller screw, a hydraulic actuator, or a pneumatic actuator and wherein the first motor is selected from the group consisting of an electric servomotor and a linear motor.

6. The injection apparatus for an industrial machine as in claim 1, wherein the industrial machine is a plastic injection molding machine.

7. The injection apparatus for an industrial machine as in claim 1, wherein the second drive mechanism is provided with a ball screw and a ball nut arrangement that converts rotating motion of a rotary drive axis of the motor into linear motion.

8. The injection apparatus for an industrial machine as in claim 1, 2, 3 or 4, wherein the second motor is selected from the group consisting of an electric servomotor, and a linear motor.

9. An injection apparatus for an industrial machine, comprising:
- an injection barrel that communicates with a cavity formed by at least a pair of mold dies, said injection barrel configured to introduce mold material to said cavity;
- a plunger inserted in said barrel in which said plunger is capable of being rotated and of a reciprocating motion so as to inject and fill said mold material into said cavity;
- a support member configured to hold an end of said plunger opposite to said cavity, said support member being capable of moving in a direction of said reciprocating motion;
- a first drive mechanism, including a first motor, configured to move said support member in the direction of the reciprocating motion;
- a second drive mechanism, including a second motor, configured to move said first drive mechanism in the direction of the reciprocating motion; and
- a third drive mechanism, including a third motor, configured to rotate said plunger in said barrel.

10. The injection apparatus for an industrial machine as in claim 9, wherein the first drive mechanism is provided with a ball screw and a ball nut arrangement that converts rotating motion of a rotary drive axis of the motor into linear motion.

11. The injection apparatus for an industrial machine as in claim 10, wherein the second drive mechanism is arranged to be in parallel with the ball screw of the first drive mechanism.

12. The injection apparatus for an industrial machine as in claim 10, wherein the second drive mechanism is arranged to be series or concentric to the axis line of the ball screw.

13. The injection apparatus for an industrial machine as in claim 9, wherein the first motor is selected from the group consisting of an electric servomotor a linear motor.

14. The injection apparatus for an industrial machine as in claim 9, wherein the second motor is selected from the group consisting of an electric servomotor a linear motor.

* * * * *